J. C. FRENCH.
TRACTOR EXCAVATOR.
APPLICATION FILED DEC. 26, 1917.
1,278,454.
Patented Sept. 10, 1918.
6 SHEETS—SHEET 2.
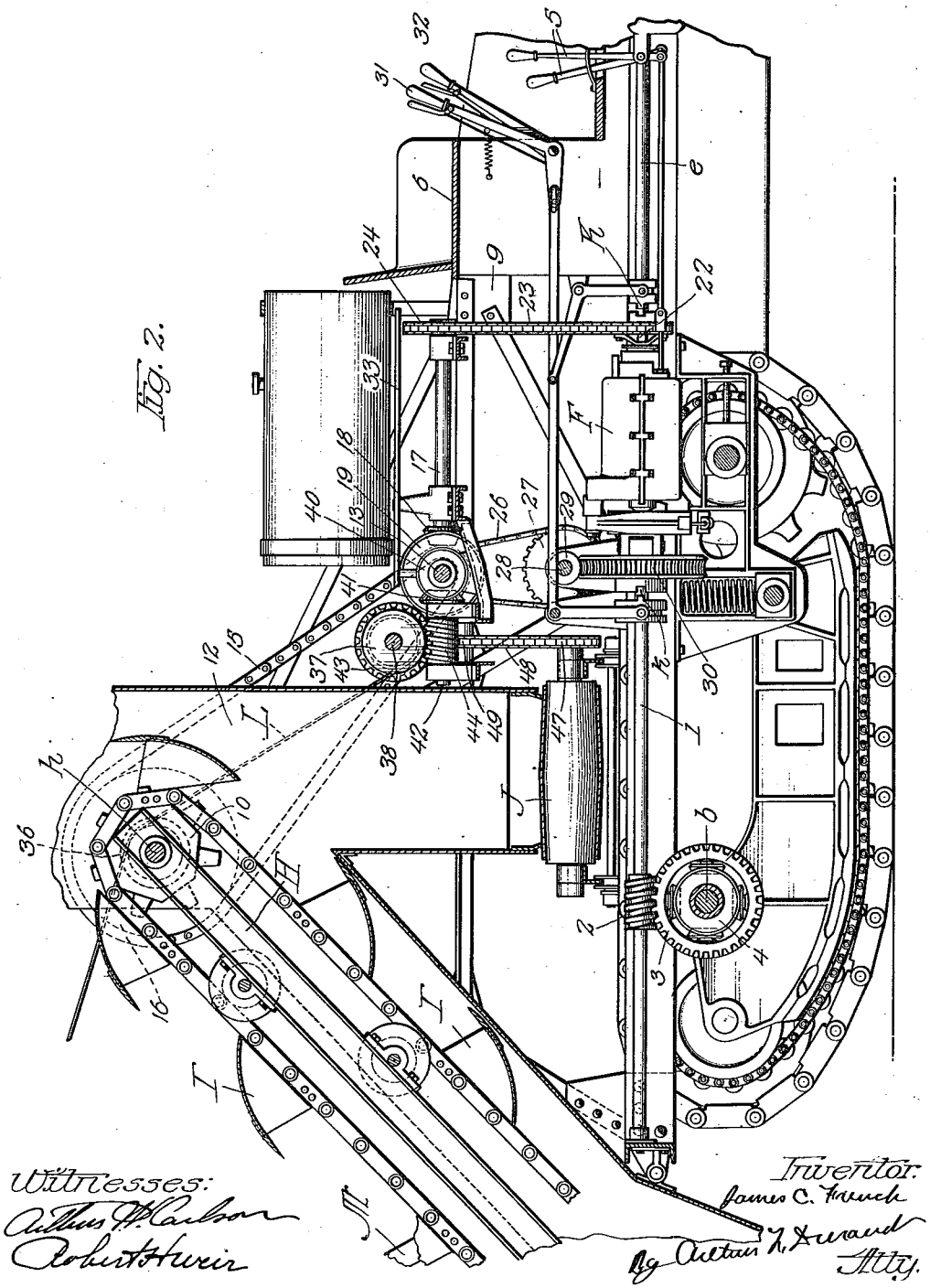

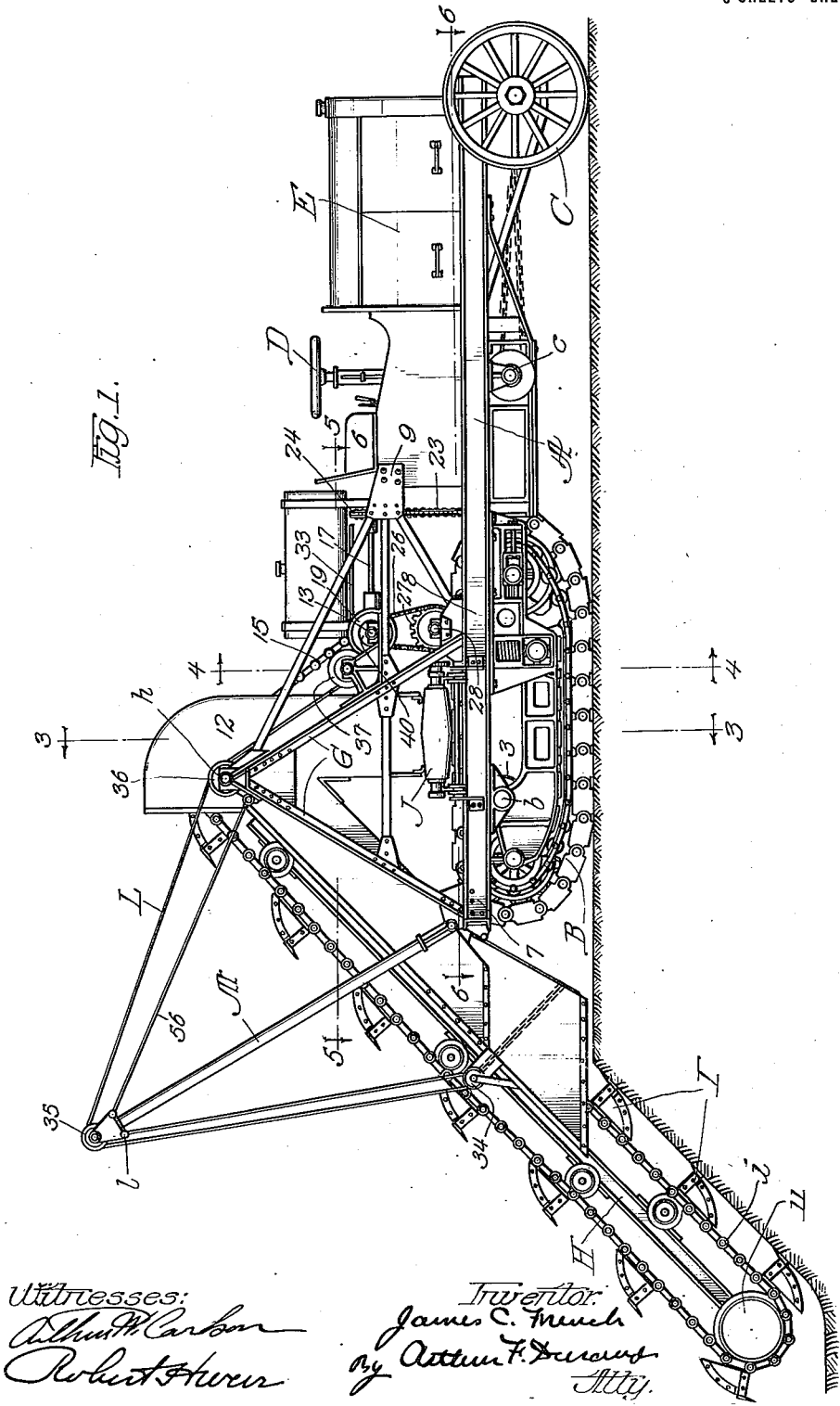

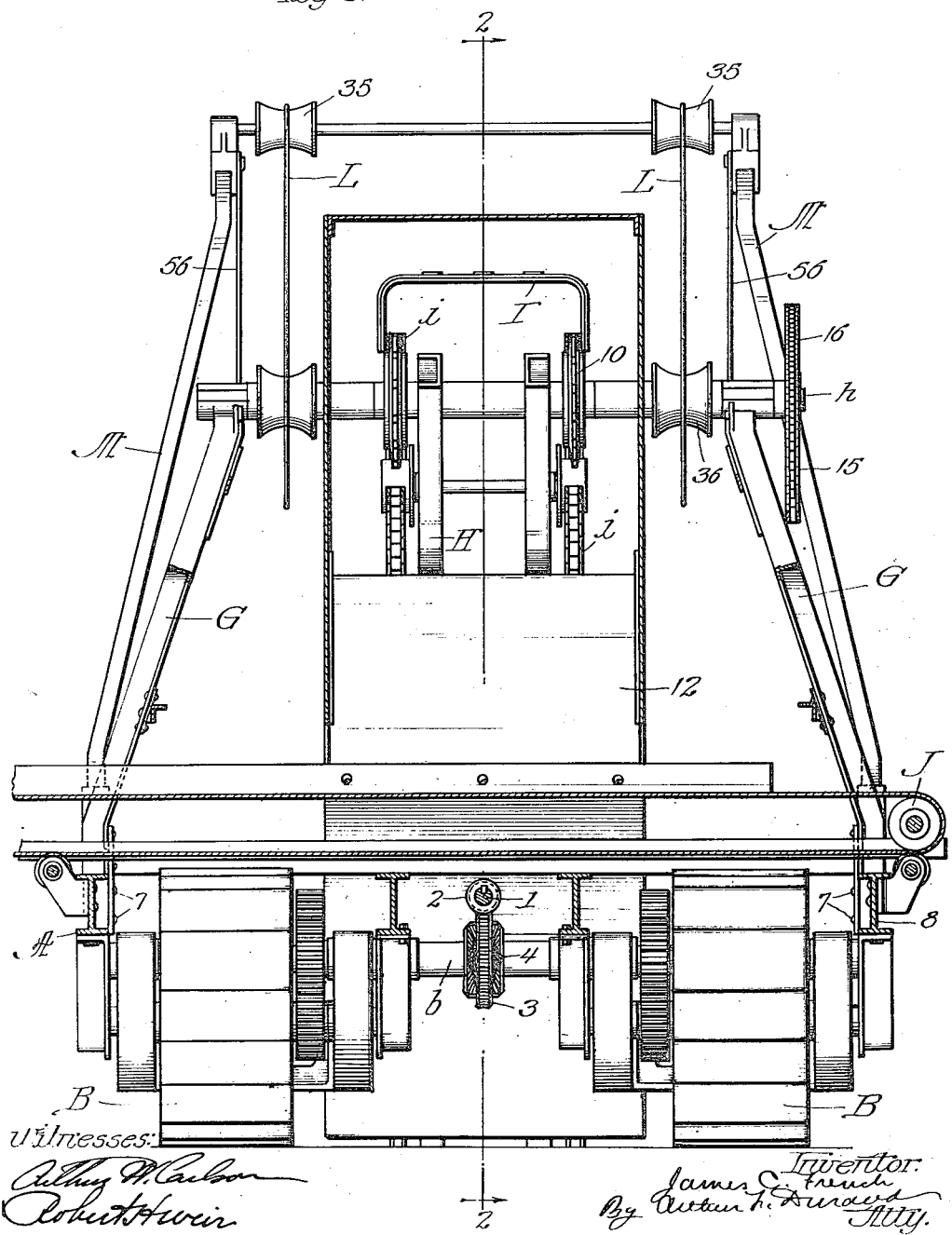

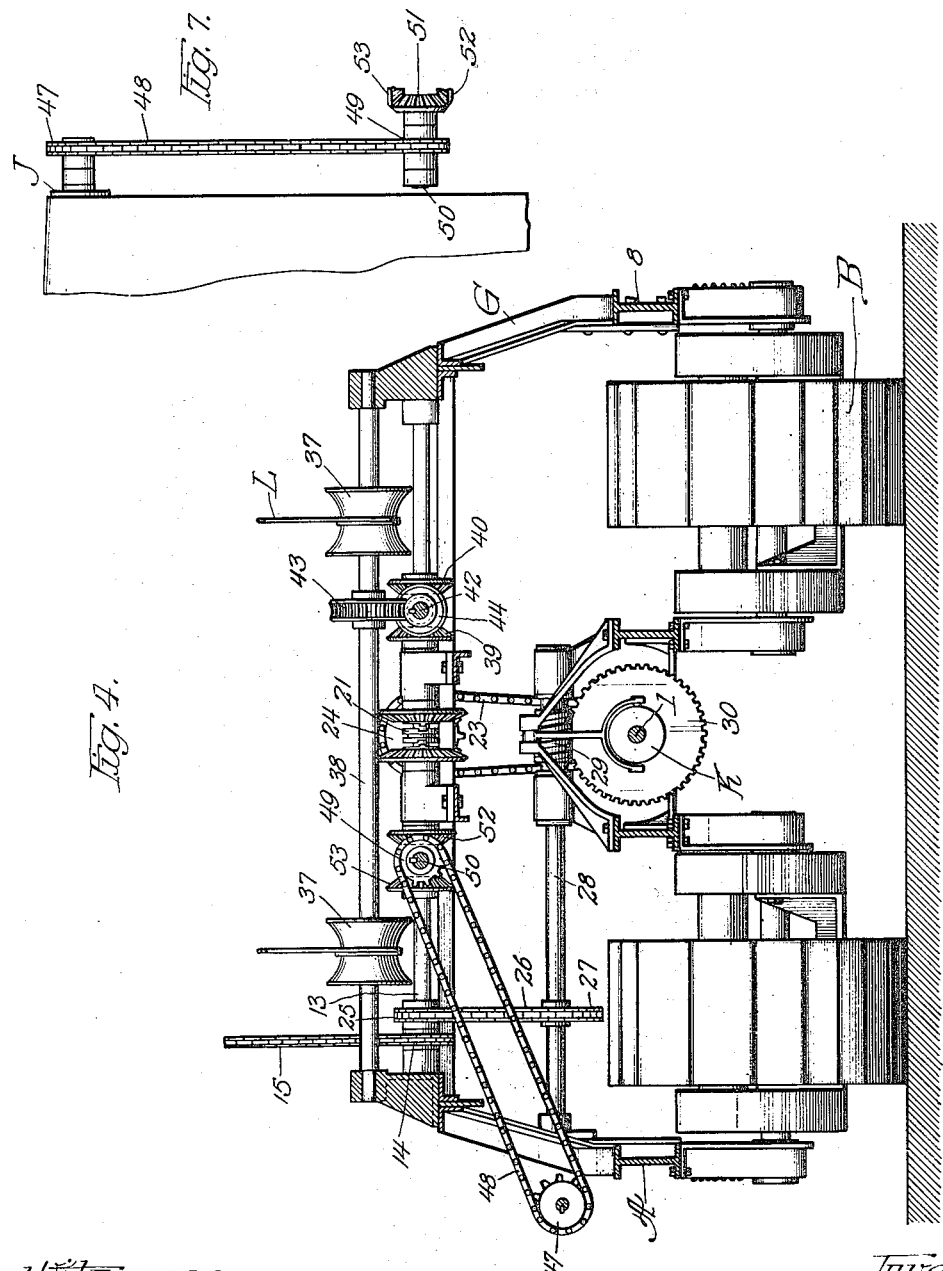

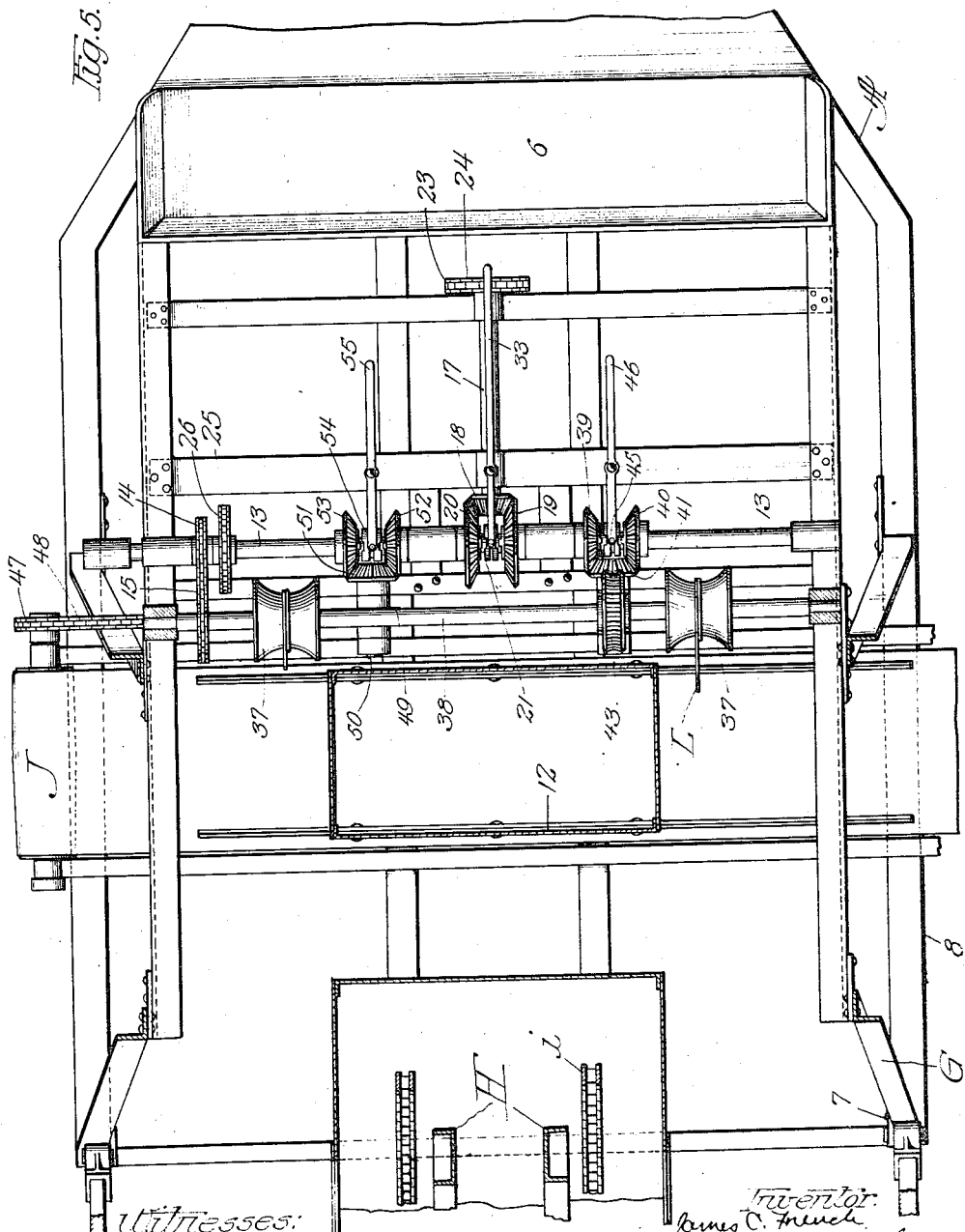

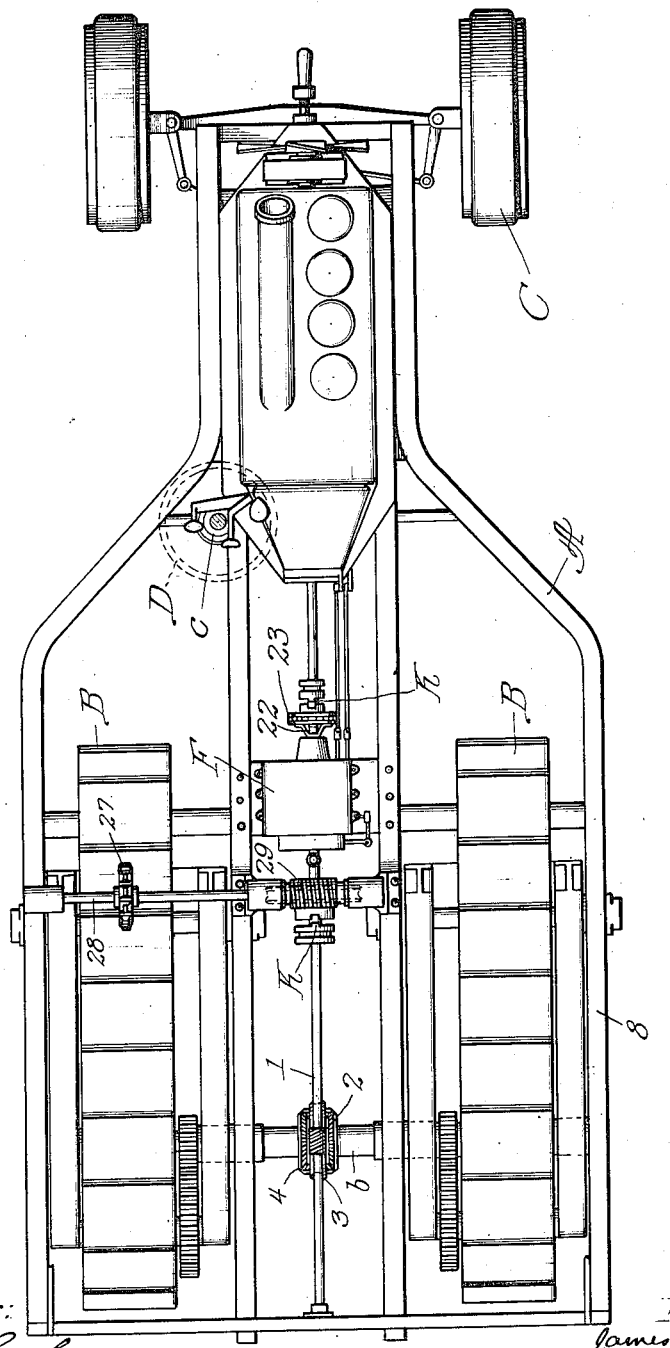

UNITED STATES PATENT OFFICE.

JAMES C. FRENCH, OF CHICAGO, ILLINOIS, ASSIGNOR TO FREDERICK C. AUSTIN, OF CHICAGO, ILLINOIS.

TRACTOR-EXCAVATOR.

1,278,454.  Specification of Letters Patent.  Patented Sept. 10, 1918.

Application filed December 26, 1917. Serial No. 208,958.

*To all whom it may concern:*

Be it known that I, JAMES C. FRENCH, a citizen of the United States of America, and resident of Chicago, county of Cook, and State of Illinois, have invented a certain new and useful Improvement in Tractor-Excavators, of which the following is a specification.

This invention contemplates a combined tractor and excavator having means whereby the excavating apparatus can be removed from the rear end of the body frame or chassis of the vehicle, and which said chassis is provided with front steering wheels and rear traction means, so that when the excavating apparatus is removed the vehicle can then be employed as an ordinary motor truck for carrying freight, or as a tractor for pulling agricultural implements or machines, or for any other similar purpose.

It is also an object to provide certain details and features of construction and combinations tending to increase the general efficiency and desirability of a combined tractor and excavator of this particular character.

To these and other useful ends, the invention consists in matters hereinafter set forth and claimed.

In the accompanying drawings:—

Figure 1 is a side elevation of a combined tractor and excavator embodying the principles of the invention.

Fig. 2 is a longitudinal section of the rear portion of said tractor and excavator, on a larger scale, showing the lower end portion of the excavating apparatus broken away for convenience of illustration, being a section on line 2—2 in Fig. 3.

Fig. 3 is an enlarged transverse section on line 3—3 in Fig. 1.

Fig. 4 is an enlarged transverse section on line 4—4 in Fig. 1.

Fig. 5 is an enlarged horizontal section on line 5—5 in Fig. 1.

Fig. 6 is an enlarged horizontal section on line 6—6 in Fig. 1.

Fig. 7 is a detail or fragmentary plan view of a portion of the horizontal conveyer, and of the connections for operating said conveyer.

As thus illustrated, the invention comprises a body frame or chassis A provided with rear traction means B, of any suitable character, and front steering wheels C suitably controlled through the medium of the steering gear $c$ and the steering wheel D, which may be of any suitable character. As shown, the traction means B comprises a pair of caterpillars arranged side by side and operated by a transverse axle $b$, which latter is preferably of the kind ordinarily employed on automobiles or motor trucks. Like an ordinary motor truck or automobile, the forward end of the chassis is provided with an internal combustion engine or other motor E provided with a rearwardly extending shaft $e$, in the usual manner, which is connected with the longitudinal shaft 1 through the medium of the gear-box F, which latter is of any suitable known or approved character, being constructed in the ordinary manner with gears which provide high and low speed for the vehicle when in use as a motor truck, and which has a neutral position which renders the power-transmitting-connections inoperative—that is to say, which opens the transmission of power from the motor to the shaft 1, the latter being provided with a worm 2 that engages the gear 3 of the ordinary differential gearing 4 with which a rear axle of this character is ordinarily provided, whereby the two caterpillars need not operate at the same speed, but may run at different speeds, just as the two rear wheels of an automobile are connected by differential gearing to travel at different speeds for the usual and well known reasons. Hand-levers 5 are provided near the seat 6 to control the gear-box or gear-set F in the usual or ordinary manner, so that the vehicle may be caused to travel at different speeds or may be stopped, if such is desired. It will be understood, of course, that the shaft $e$ may be connected directly to the motor, or through a clutch (not shown) in any suitable or desired or ordinary manner. The gear-box F or gear-set, as it is commonly called, also includes, of course, a provision for reversing the motion of the traction means, when it is desired to back the motor truck, just as an ordinary automobile is reversed by the gearing thereof. It will be seen that a clear space is provided behind the seat 6, over the traction means, and that the tractor or motor truck thus formed can be used for any of the various purposes for which trucks or tractors are ordinarily employed.

To convert the tractor into an excavator, the load-carrying space in rear of the seat is occupied by the attachable and detachable frame G, which latter is removably bolted to the chassis at 7 and 8 and to the back of the seat at 9, thus providing a supporting framework for the excavating apparatus. The latter comprises a swinging digging beam H having its upper end mounted on the transverse shaft $h$, so that the beam is movable up and down about a transverse axis. The endless series of buckets I is mounted on sprocket chains $i$ which travel over sprockets 10 on the shaft $h$ and around idlers 11 at the lower end of the beam. Said buckets are adapted to cut into the ground as they travel upward in front of the beam H, directly in rear of the vehicle or motor truck, and discharge their loads from their rear ends when they reach the upper end of the beam, (see Fig. 2) the excavated dirt being discharged into the housing 12 which forms a sort of hopper to deliver the dirt upon the transverse conveyer J, the latter being suitably mounted either directly on the chassis itself, or on the frame G which ever is most convenient or desirable. In this way, the excavated dirt is carried upward and discharged onto the conveyer J, and by the latter discharged laterally from the machine onto the ground, or into a wagon traveling at one side of the machine. The mechanism for operating the excavating apparatus comprises a transverse shaft 13 mounted in suitable bearings on the auxiliary frame G, this shaft having a sprocket-wheel 14 at one end thereof connected by a sprocket chain 15 with a larger sprocket wheel 16 on the shaft $h$, whereby rotation of the shaft 13 will cause a slower rotation of the shaft $h$, in a direction to properly operate the buckets. This shaft 13 is driven by a longitudinal shaft 17 mounted in suitable bearings on the frame G, having its rear end provided with a bevel pinion 18 to engage the loose bevel wheels 19 and 20 on the shaft 13, a clutch mechanism 21 being provided between these two bevels 19 and 20 to connect either bevel with the shaft upon which they are mounted, whereby said transverse shaft 13 can be rotated in either direction by operation of said clutch, or may be stopped entirely. The devices for connecting said mechanism with the motor, thereby to operate the excavating apparatus, comprises a sprocket 22 which is loose on the shaft $e$ and connected by a sprocket chain 23 with the sprocket 24 on the front end of the shaft 17, so that the shafts $e$ and 17 will always rotate in the same direction—that is to say, the two shafts will never rotate in directions opposite to each other. The gearing for connecting said mechanism with the traction means, to provide an indirect drive for the tractor, when the excavating apparatus is in operation, comprises a sprocket wheel 25 on the shaft 13 connected by a sprocket chain 26 with a sprocket wheel 27 on the transverse shaft 28, which latter is mounted in suitable bearings on the frame G, below the shaft 13, whereby these two shafts each rotate in the same direction as the other. Said shaft 28 is provided with a worm 29 to engage the worm-gear 30 which is loose on the shaft 1, whereby the substitute or indirect drive employed for excavating purposes includes two sets of worm-gearing, thus causing a very powerful action of the traction means to move the machine slowly forward at very low speed while the excavating apparatus is in operation in the ground. As shown, the instrumentalities for controlling the transmission of power from the motor to the traction means, through the mechanism including the shaft 13, comprises a suitable clutch K for coupling the sprocket 22 to the shaft $e$, and a suitable clutch mechanism $k$ for coupling the worm-gear 30 to the shaft 1, so that the transmission of power will not be through the gear-box or gear-set F, (the latter being open or in neutral position) but will be from the shaft $e$ through the sprocket chain 23 to the shaft 17, through the shaft 13 and the sprocket chain 26 to the shaft 28, and from the latter through the worm-gearing 29 and 30 to the shaft 1, and from the latter through the differential gearing previously described, to the caterpillars or other traction means. It will also be seen, of course, that the instrumentalities for thus controlling the transmission of power include the clutch mechanism 21, previously described, as by opening this clutch or adjusting it to middle position the rotation of the shaft 13 can be stopped, and this will stop the traction means as well as the excavating apparatus. Any suitable means can be employed for controlling the clutches K and $k$ as, for example, the two hand-levers 31 and 32 which are arranged near the driver's seat. The clutch 21 can be controlled by a hand-lever 33, or by any other suitable means. By opening the clutch $k$, the traction means will be stopped, but the excavating apparatus will continue in operation, whenever this is necessary or desirable. By opening the clutch K the entire machine, including the traction means and excavating apparatus, is brought to a stand-still. By opening the clutch $k$ and then suitably controlling the gearing of the gear-box F, in a manner that will be readily understood, and by then opening the clutch K or the clutch 21, the entire machine can then be propelled either forward or backward at comparatively high speed, the direct drive having thereby been substituted for the indirect drive. When the machine is traveling from place to place, the excavating apparatus is raised above ground.

and this is done by hoisting means consisting of cables L which have their ends secured at 1 to the rearwardly extending boom or brace M, and which then extend downward and around the sheaves 34 on the beam H, then upward and around the sheaves 35 on the booms or braces M (there being one of these booms or braces at each side of the excavating apparatus) and then downward and over the sheaves 36 on the shaft $h$ to the winding drums 37 on the transverse shaft 38, which latter is supported in suitable bearings on the frame G, in rear of the shaft 13, so that rotation of this shaft 38 will wind up the cables L and lift the digging apparatus above ground. The shaft 38, is operated by a power-transmitting connection with the shaft 13 which connection comprises the bevel gears 39 and 40 which are loose on the shaft 13 and which engage the bevel pinion 41 on the short longitudinal shaft 42, this short shaft being supported in suitable bearings on the frame G, and extending below the shaft 38 upon which the winding drums are secured. Said shaft 38 is provided with a worm-gear 43 which is engaged by the worm 44 on the shaft 42, whereby rotation of the bevel pinion 41 by either one of the bevel gears 39 or 40 will rotate the shaft 38 in either one direction or the other. For this purpose, a suitable clutch 45 is provided on the shaft 13, between the two bevel gears 39 and 40, so that either one of these bevel gears can be coupled to the shaft 13 at will, thus providing a reversing gear to reverse the rotation of the shaft 38, and to stop the rotation of this shaft, it being understood that when the clutch 45 is adjusted to middle position the shaft 38 will not be operated. A hand-lever 46 can be provided for controlling the clutch 45, and with this arrangement the excavating apparatus can be raised and lowered at will. The conveyer J is preferably mounted so that it can be adjusted endwise on the machine, thereby to discharge the dirt at either side of the excavator, in the well known manner, this adjustment of the conveyer from one side of the machine to the other being common and well known. For this purpose, however, and in order to reversibly drive the conveyer, one end thereof is provided with a sprocket wheel 47 connected by a sprocket chain 48 with the sprocket wheel 49 on the short longitudinal shaft 50, the latter being supported in suitable bearings on the frame G and provided at its forward end with a bevel pinion 51 to engage the bevel gears 52 and 53 which are loose on the shaft 13, (see Fig. 5) and which are provided between them with a clutch 54 to couple either bevel gear to the shaft 13 at will, thus providing means for reversing the direction of rotation of the shaft 50, and for thereby reversing the direction of travel of the conveyer. Any suitable provision can be made with respect to the sprocket chain 48 to permit the endwise adjustment of the conveyer, so that the latter will be properly operated in either position thereof. A hand-lever 55 or any other suitable means can be provided for controlling the clutch 54 at will. As shown, the booms or braces M are pivoted at their lower ends upon the frame G and have their upper ends held in position by rods 56 connected to the top of the auxiliary frame in any suitable manner. Thus the excavating apparatus can be raised and lowered to vary the depth of the trench, or for other purposes, and the excavated dirt carried upward by the buckets, when the apparatus is operating in the ground, can be discharged at either side of the excavator, in the manner explained.

From the foregoing it will be seen that without the excavating apparatus and the frame upon which it is mounted the vehicle is adapted for ordinary motor truck purposes, but can be quickly converted into an excavator by attaching the auxiliary frame G to the chassis to occupy the load-carrying space in rear of the driver's seat. When thus converted into an excavator, the vehicle is propelled slowly forward during the operation of the buckets, not through the direct drive employed for motor truck purposes, but through the indirect or auxiliary drive which insures not only slower speed for excavating purposes, but also the more powerful propelling action which is necessary during the excavating operation. The excavating apparatus is operated by the ordinary internal combustion engine or motor of the vehicle, not through the regular or ordinary transmission employed for driving the vehicle forward, but through an auxiliary or substitute transmission which insures the desired results.

What I claim as my invention is:—

1. A tractor and excavator comprising a chassis having traction means and steering gear, a motor and power-transmitting-connection therefrom to directly operate said traction means, and a load-carrying space at the rear thereof, so that the self-propelled vehicle thus provided may be employed for ordinary motor-truck purposes; a frame to detachably occupy said load-carrying space, when the motor-truck is used for excavating purposes, an excavating apparatus on said frame, and mechanism on said frame to operate said apparatus; devices to connect said mechanism with said motor to operate the excavator, gearing to indirectly drive said traction means from said mechanism, and instrumentalities for controlling the transmission of power to said traction means through said devices and mechanism and gearing to drive the vehicle at slow speed when said apparatus is operating in the ground.

2. A structure as specified in claim 1, said power-transmitting-connection comprising a longitudinal shaft, said gearing including a transverse shaft having a worm thereon and a worm-gear loose on said shaft to engage said worm, and said instrumentalities including a clutch to connect said worm-gear to said longitudinal shaft.

3. A structure as specified in claim 1, said motor having a longitudinal shaft, and said instrumentalities including a clutch on said shaft to control the transmission of power from the motor to said devices.

4. A structure as specified in claim 1, said power-transmitting-connection including longitudinal shafting having a gear-box therein to control the direct transmission of power to the traction means, said devices being loosely connected to said shafting in front of said gear-box, said gearing including a worm-gear loose on said shafting behind said gear-box, and said instrumentalities including clutches for said devices and said worm-gear to control the indirect drive through said mechanism to the traction means.

5. A structure as specified in claim 1, and lifting means operated by said mechanism to raise and lower said excavating apparatus.

6. A structure as specified in claim 1, said mechanism comprising a transverse shaft having sprocket connection with the upper end of said excavating apparatus, and said gearing including a worm-gear having sprocket connection with said transverse shaft.

7. A structure as specified in claim 1, said excavating apparatus comprising a digging beam pivoted on said frame to swing up and down in the trench about a transverse axis, and an endless series of buckets on said beam.

8. A structure as specified in claim 1, and means including a winding drum on said detachable frame to raise and lower said excavating apparatus.

Signed by me at Chicago, Cook county, Illinois, this 7th day of December, 1917.

JAMES C. FRENCH.